(12) United States Patent
Ghabra et al.

(10) Patent No.: US 7,683,756 B2
(45) Date of Patent: Mar. 23, 2010

(54) WIRELESS ACCESS SYSTEM AND METHOD

(75) Inventors: Riad Ghabra, Dearborn Heights, MI (US); Mark A. Enderich, Riverview, MI (US)

(73) Assignee: Lear Corporation, Southfield, MI (US)

( * ) Notice: Subject to any disclaimer, the term of this patent is extended or adjusted under 35 U.S.C. 154(b) by 446 days.

(21) Appl. No.: 11/694,147

(22) Filed: Mar. 30, 2007

(65) Prior Publication Data
US 2008/0238637 A1  Oct. 2, 2008

(51) Int. Cl.
G05B 19/00 (2006.01)
(52) U.S. Cl. .............. 340/5.61; 340/10.3; 340/825.72
(58) Field of Classification Search .......... 340/825.69, 340/825.72, 5.2, 5.6, 5.61, 5.62, 5.64, 5.8, 340/10.1, 10.3, 10.4, 426.36; 455/522
See application file for complete search history.

(56) References Cited

U.S. PATENT DOCUMENTS

| | | | |
|---|---|---|---|
| 6,091,343 A * | 7/2000 | Dykema et al. | ........ 340/825.69 |
| 6,794,993 B1 | 9/2004 | Kessler et al. | |
| 6,801,134 B1 | 10/2004 | Juzswik | |
| 7,039,508 B2 | 5/2006 | Lin et al. | |
| 7,042,361 B2 * | 5/2006 | Kazdin et al. | .......... 340/825.69 |
| 7,202,777 B2 | 4/2007 | Tsuji et al. | |
| 2004/0183664 A1 | 9/2004 | McClelland et al. | |

FOREIGN PATENT DOCUMENTS

EP  0848123  6/1998

* cited by examiner

Primary Examiner—Thomas J Mullen
(74) Attorney, Agent, or Firm—Brooks Kushman P.C.

(57) ABSTRACT

The disclosed embodiments include a wireless access system and method that enable the transmission of wireless access signals having a desired power level. In some embodiments, the wireless access system determines the amount of supply current drawn by certain devices and causes adjustment of the wireless access signal power level based on an assessment of the supply current.

20 Claims, 1 Drawing Sheet

WIRELESS ACCESS SYSTEM AND METHOD

TECHNICAL FIELD

The embodiments described herein relate to a wireless access system and method.

BACKGROUND OF THE INVENTION

Entry systems are commonly used to enable a user to remotely access or perform some operation to a vehicle. For example, a vehicle may be equipped with a remote entry system that includes a receiving unit located on the vehicle, which communicates with an electronic key fob. The key fob may enable the user to gain access to the vehicle, start an engine located on the vehicle, and the like. Conventionally, in some applications, a user's engagement of a door handle causes a device within the vehicle to transmit a low-frequency challenge signal to a key fob for authentication. In response, the key fob generates a radio-frequency response signal that is transmitted to the device. The controller then transmits a signal to the door to unlock the doors. Such an authentication process may also apply to starting a vehicle engine.

In some cases, the power of the low frequency signal varies as a result of system and environmental anomalies. The receiving device (e.g., the key fob) may be specifically tuned to the receive low frequency signals having a certain power level. Additionally, the propagation of the low-frequency signal to the receiving device may be detrimentally affected by the signal power level.

The embodiments described herein were conceived in view of these and other disadvantages of conventional entry systems.

SUMMARY

The disclosed embodiments include a wireless access system and method. In one embodiment, the system includes a power source that is coupled to an electronic device. The device has a driver for drawing a supply current from the power source and generating a driver current. An antenna is also included for receiving the driver current and wirelessly transmitting a wireless access signal having a power level in response to the driver current. In one embodiment, the power level of the wireless access signal corresponds to the driver current. Additionally, a controller may be in communication with the driver and have a predetermined current range within a memory. The controller is configured to determine whether the supply current is within the predetermined current range and cause an adjustment of the wireless access signal power level when the supply current is outside of the predetermined current range.

In one embodiment, the method includes drawing a supply current from the power source through the use of a driver. The method further includes generating a driver current and receiving the driver current at an antenna. The method also includes wirelessly transmitting the wireless access signal having a first power level in response to the driver current wherein the first power level of the wireless access signal corresponds to the driver current. An additional aspect of the method includes determining whether the supply current is within the predetermined current range. The method may also include generating control signals, through the use of the controller, causing an adjustment of the wireless access signal power level when the supply current is not within the predetermined current range, thereby causing the wireless access signal to have a power level that is equal to or greater than a predetermined power level. Additionally, the method includes transmitting a wireless access signal having the second power level.

BRIEF DESCRIPTION OF THE DRAWINGS

The novel features of the described embodiments are set forth with particularity in the appended claims. These embodiments, both as to their organization and manner of operation, together with further advantages thereof, may be best understood with reference to the following description, taken in connection with the accompanying drawings in which:

DETAILED DESCRIPTION OF THE EMBODIMENT(S)

As required, detailed descriptions of embodiments are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific functional details disclosed herein are not to be interpreted as limiting, but merely as a representative basis for the claims and/or as a representative basis for teaching one skilled in the art.

Figure 1:
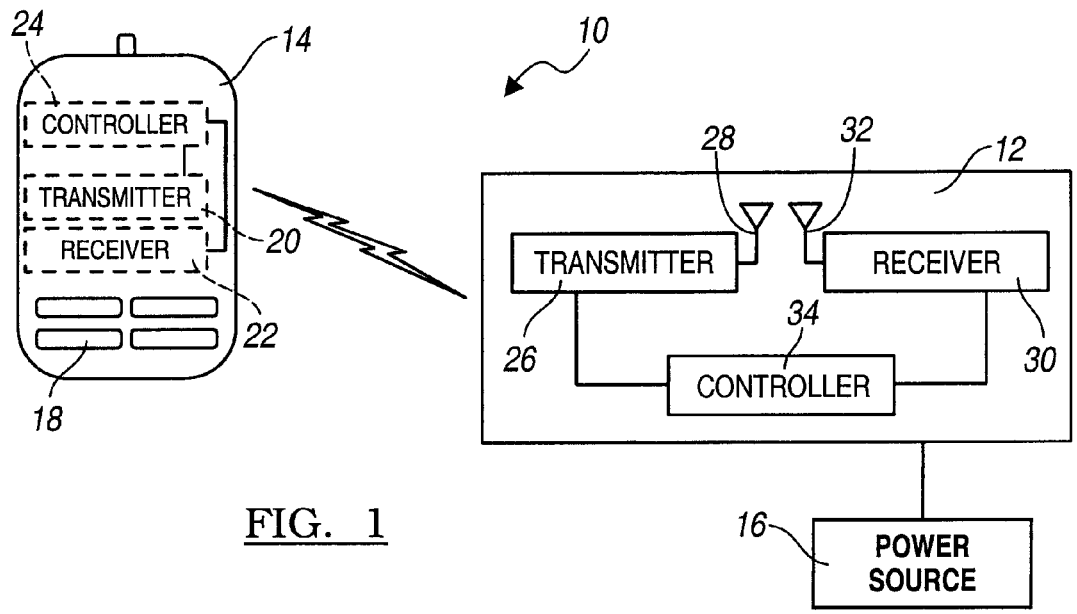
FIG. 1 illustrates a wireless access signal in accordance with an embodiment of the present invention.
Figure 2:
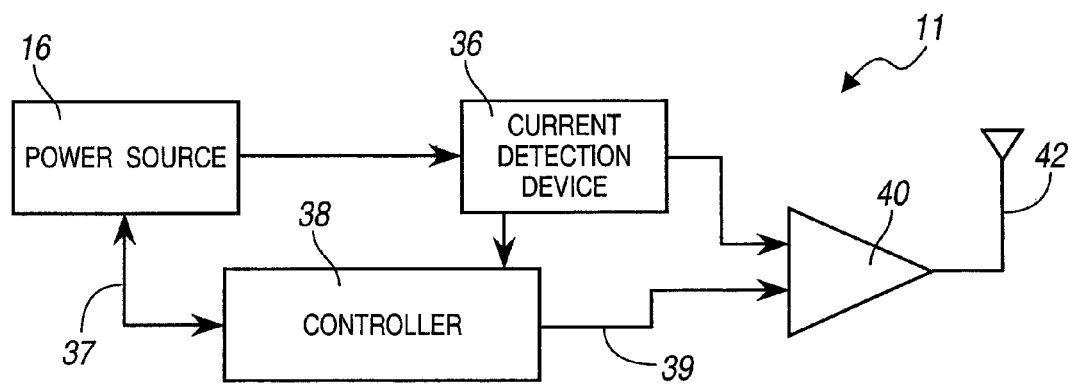
FIG. 2 illustrates a schematic block diagram of a wireless access signal in accordance with an embodiment of the present invention.

Referring to FIG. 1, a wireless access system 10 is shown that includes a wireless access device 12 and a portable device 14. FIG. 2 illustrates a detailed circuit diagram of a wireless access system 11 in accordance with an embodiment of the present invention. Wireless access system 11 provides a detailed illustration of wireless access device 12 absent a receiver 30. Wireless access systems 10 and 11 may be keyless entry systems for vehicular and non-vehicular objects (e.g., cars, buildings, and the like). In one embodiment, the wireless access systems 10 and 11 may be passive entry systems that enable a user to automatically gain access to a vehicle to perform a function without engagement of a hand-held or portable device (e.g., pressing buttons on key fob/portable device 14).

Portable device 14 may be a keyless entry device. As such, portable device 14 may include one or more buttons 18 that may be selected by user to cause the initiation or execution of a vehicle function. In some embodiments, the keyless entry device may be a passive entry fob. In such an embodiment, initiation or execution of a vehicle function may occur merely by the placement of portable device 14 within close proximity to device 12. Portable device 14 includes a transmitter 20 and a receiver 22 that communicate with a controller 24. Controller 24 may have a memory containing a number of codes that are wirelessly transmitted via transmitter 20 to receiver 30 for authentication of device 14. Receiver 22 may be configured to receive wireless access signals, which may be low-frequency signals, from wireless access device 12. The wireless access signal may operate as a challenge signal that causes portable device 14 to transmit a radio-frequency signal that is received by wireless access device 12. In one embodiment, the low-frequency signals may be signals having a frequency in a range of 19 kH to 140 kH.

Wireless access device 12 may be an electronic device that includes a transmitter 26, a receiver 30, and a controller 34. As shown in FIG. 1, device 12 may be powered by a power source 16, which may be a battery, ultra capacitor, or voltage regulator may be coupled to device 12. As shown, transmitter 26 has an antenna 28 attached thereto for the transmission of wireless access signals. In one embodiment, antenna 28 is designed to transmit low-frequency signals. Receiver 30 also includes an antenna 32 that enables device 12 to receive radio-frequency signals from portable device 14. In one embodiment, antenna 32 is adapted to receive ultra-high frequency (UHF) signals. It is recognized that some embodiments may utilize a single antenna for the transmission and reception of signals. Controller 34 communicates with transmitter 26 and receiver 32 so as to coordinate and process the transmission and reception of signals.

Controller 34 may have a memory for storing data. In one embodiment, controller 34 may include a table or plurality of current values that enable a desired low-frequency having a desired power level to be transmitted. The electronic device 12 is adapted to assess the power level of the wireless access signals transmitted to portable device 14 based on an amount of current drawn by certain electronic devices. In one embodiment, the power level of a transmitted signal from device 12 directly corresponds with a supply of current to various electrical components of device 12.

Specifically, as shown in FIG. 2, wireless access system 11 includes a power source 16, a current detection device 36, a controller 38, and a driver 40. Controller 38 may be the same controller as controller 34 (FIG. 1). Power source 16 is adapted to provide current and voltage to wireless access system 11. Driver 40 draws a supply current from power source 16 that is applied to an antenna 42. In response, antenna 42 transmits the wireless access signal (e.g., low-frequency signal) to other devices (e.g., portable device 14). Driver 40 may be comprised of a configuration of electronic components and/or logic circuits that enable the generation of a current that is applied to antenna 42 for the transmission of a wireless access signal.

Current detection device 36 detects the amount of supply current drawn by driver 40 and transmits signals to controller 38 that are indicative of the amount of supply current being supplied to driver 40. Controller 38 processes the signals from device 36 in determining the supply current drawn by driver 40. As stated above, the amount of supply current drawn by driver 40 corresponds to the power level of the wireless access signal transmitted by antenna 42. In one embodiment, supply currents in a range of 40 milliamperes to 500 milliamperes enable a transmission of a low frequency signal having a desired power level. It is recognized that the specific power level of the transmitted signal may vary from vehicle to vehicle in accordance with design and performance requirements. For example the low frequency power level may range from 10 watts (W) to 20 watts (W).

When the controller assesses the amount of supply current being drawn by driver 40, controller 38 determines whether or not the supply current falls within a desired current range. In one embodiment, a desired current range that would yield wireless access signals having a desired power level include currents in a range of 40 mA-500 mA. It is recognized that the present invention contemplates other current ranges without departing from the scope of the present invention. If the supply current does not fall within the desired current range, controller 38 generates control signals that cause an adjustment in supply current thereby causing the resulting wireless access signals to be transmitted having a desired power level.

In one embodiment, controller 38 may cause an adjustment in the supply current drawn by driver 40 and the power level of the wireless access signal by generating control signals via a communications line 37 to power source 16. In such an embodiment, the control signals transmitted over communication line 37 cause power source 16 to adjust the supply voltage being supplied to driver 40. The adjustment in supply voltage causes an adjustment in the supply current drawn by driver 40. Accordingly, the resulting wireless access signal will be transmitted at a desirable power level.

Alternatively, when controller 38 determines that the supply current does not fall within the desired current range, controller 38 may cause an adjustment in the power level of transmitted wireless access signals by adjusting a duty cycle of control signals that are transmitted directly to driver 40. In one embodiment, the signals transmitted via communications line 39 (from controller 38) to driver 40 may have the duty cycle adjusted so as to improve the power level of transmitted wireless access signals. In one embodiment, the duty cycle of a control signal that may yield a desired power level for a wireless access signal may be 15% to 50%. It is recognized that alternative embodiments may have a duty cycle that varies from those described above without departing from the scope of the present invention.

In some embodiments, the assessment of supply currents drawn by driver 40 occurs at each activation of wireless access systems 10 and 11. For example, when a portable device (e.g., device 14 of FIG. 1) comes in close proximity to device 12 or a button is selected to open a door, dynamic adjustment of the wireless access signal power level may occur. It is recognized that the frequency at which dynamic power level adjustment occurs may vary in accordance with the particular implementation of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A wireless access system comprising:
a power source; and
an electronic device coupled to the power source, the device having:
a driver for drawing a supply current from the power source and generating a driver current,
an antenna for receiving the driver current and wirelessly transmitting a wireless access signal having a power level in response to the driver current, wherein the power level of the wireless access signal corresponds to the driver current, and
a controller being in communication with the driver and having a predetermined current range within a memory; wherein the controller determines whether the supply current is within the predetermined current range, the controller causing an adjustment of the power level when the supply current is outside of the predetermined current range.

2. The system of claim 1, further comprising:
a portable device configured to receive the wireless access signal and transmit an entry signal to a receiver.

3. The system of claim 2, wherein the portable device includes a keyless entry device.

4. The system of claim 3, wherein the keyless entry device includes a passive entry fob.

5. The system of claim 4, wherein the passive entry fob is configured to transmit a response signal to the receiver.

6. The system of claim 1, wherein adjusting the power level includes adjusting a duty cycle of control signals transmitted to the driver.

7. The system of claim 1, wherein adjusting the power level includes the controller adjusting a supply voltage supplied to the driver by the power source.

8. The system of claim 1, further comprising:
a current detection device for detecting the supply current being supplied by the power source, the current detection device transmitting to the controller signals indicative of the supply current.

9. A method of transmitting a wireless access signal through the use of a wireless access system coupled to a power source and having a controller, wherein the controller has predetermined current range within a memory, the method comprising:
drawing a supply current from the power source through the use of a driver;
generating a driver current;
receiving the driver current at an antenna;
wirelessly transmitting the wireless access signal having a first power level in response to the driver current, wherein the first power level of the wireless access signal corresponds to the driver current;
determining whether the supply current is within the predetermined current range;
generating a control signal to adjust the first power level when the supply current is not within the predetermined current range thereby causing the wireless access signal to have a second power level that is equal to or greater than a predetermined power level; and
transmitting the wireless access signal having the second power level.

10. The method of claim 9 further comprising:
receiving the wireless access signal at a portable device; and
transmitting an entry signal to an electronic device.

11. The method of claim 10, wherein the portable device includes a keyless entry device.

12. The method of claim 11, wherein the keyless entry device includes a passive entry fob.

13. The method of claim 12, wherein the passive entry fob is configured to transmit a response signal to the electronic device in response to the wireless access signal.

14. The method of claim 9, wherein adjusting a first power level includes adjusting a duty cycle of control signals transmitted to the driver.

15. The method of claim 9, wherein adjusting the power level includes adjusting a supply voltage supplied to the driver by the power source.

16. The method of claim 9, further comprising:
detecting the supply current being supplied by the power source through the use of a current detection device; and
transmitting, to the controller, a signal indicative of the supply current.

17. A passive entry system configured to generate a low-frequency signal having a predetermined power level comprising:
a power source;
a module coupled to the power source, the module having:
a driver for drawing a supply current from the power source and generating a driver current,
an antenna for receiving the driver current and wirelessly transmitting a low-frequency signal having a first power level in response to the driver current, wherein the first power level corresponds with the driver current,
a current detection device for detecting the supply current being supplied by the power source, the current detection device transmitting a signal indicative of the supply current, and
a controller being in communication with the driver and receiving the signal indicative of the supply current, the controller having a predetermined current range within a memory wherein the controller determines whether the supply current is within the predetermined current range, the controller causing an adjustment of the first power level to a second power level when the supply current is outside of the predetermined current range, wherein the second power level is equal to or greater than the predetermined power level;
wherein the module transmits the low-frequency signal having the second power level; and
a portable device configured to receive the low-frequency signal, the portable device transmitting an entry signal to the module.

18. The system of claim 17, wherein adjusting the first power level to the second power level includes the controller adjusting a duty cycle of a control signal transmitted to the driver.

19. The system of claim 17, wherein adjusting the first power level to the second power level includes the controller adjusting a supply voltage supplied to the driver by the power source.

20. The system of claim 17, wherein the low-frequency signal has a frequency in the range of 19 kilohertz to 140 kilohertz.

* * * * *